(12) United States Patent
Yoshida et al.

(10) Patent No.: US 11,225,738 B2
(45) Date of Patent: Jan. 18, 2022

(54) LONG-FIBER NONWOVEN FABRIC AND FILTER REINFORCEMENT MATERIAL USING THE SAME

(71) Applicant: TOYOBO CO., LTD., Osaka (JP)

(72) Inventors: Hideo Yoshida, Otsu (JP); Chiaki Katsuki, Otsu (JP); Masahiro Saijo, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 62 days.

(21) Appl. No.: 16/620,229

(22) PCT Filed: Jun. 4, 2018

(86) PCT No.: PCT/JP2018/021329
§ 371 (c)(1),
(2) Date: Dec. 6, 2019

(87) PCT Pub. No.: WO2018/225671
PCT Pub. Date: Dec. 13, 2018

(65) Prior Publication Data
US 2020/0165760 A1 May 28, 2020

(30) Foreign Application Priority Data
Jun. 9, 2017 (JP) .............................. JP2017-114230

(51) Int. Cl.
| | | |
|---|---|---|
| *B01D 39/16* | (2006.01) | |
| *D01F 8/14* | (2006.01) | |
| *D04H 3/011* | (2012.01) | |
| *D04H 3/16* | (2006.01) | |
| *B32B 5/02* | (2006.01) | |
| *D04H 3/007* | (2012.01) | |

(52) U.S. Cl.
CPC .............. *D04H 3/011* (2013.01); *D04H 3/16* (2013.01); *B01D 2239/1233* (2013.01); *B32B 5/022* (2013.01); *D04H 3/007* (2013.01); *D10B 2331/04* (2013.01)

(58) Field of Classification Search
CPC .......... D04H 3/011; D04H 3/007; D04H 3/16; D10B 2331/04; B01D 2239/1233; B32B 5/022
See application file for complete search history.

(56) References Cited

U.S. PATENT DOCUMENTS

| | | |
|---|---|---|
| 5,993,944 A | 11/1999 | Honna et al. |
| 2003/0148688 A1 | 8/2003 | Matsunaga et al. |
| 2004/0265577 A1 | 12/2004 | Goda |
| 2005/0172812 A1 | 8/2005 | Ueda et al. |
| 2008/0022642 A1* | 1/2008 | Fox .......... D04H 3/14 55/521 |
| 2008/0302072 A1 | 12/2008 | Hassmann et al. |
| 2010/0083838 A1 | 4/2010 | Togashi |
| 2010/0133173 A1 | 6/2010 | Inagaki |
| 2011/0253645 A1 | 10/2011 | Hassmann et al. |
| 2013/0111861 A1* | 5/2013 | Sakamoto .............. D04H 3/011 55/500 |
| 2017/0016157 A1 | 1/2017 | Saitoh et al. |
| 2020/0040495 A1* | 2/2020 | Yamada .................. D04H 3/14 |

FOREIGN PATENT DOCUMENTS

| | | |
|---|---|---|
| CN | 1196766 A | 10/1998 |
| CN | 1545573 A | 11/2004 |
| CN | 1655860 A | 8/2005 |
| CN | 1320180 C | 6/2007 |
| CN | 101652167 A | 2/2010 |
| CN | 101680185 A | 3/2010 |
| CN | 101824708 A | 9/2010 |
| CN | 101851830 A | 10/2010 |
| CN | 102985608 A | 3/2013 |
| CN | 106164354 A | 11/2016 |
| CN | 109804112 A | 5/2019 |
| DE | 102009006099 A1 | 9/2010 |
| EP | 3527706 A1 | 8/2019 |
| JP | 4-176311 A | 6/1992 |
| JP | 5-44218 U | 6/1993 |
| JP | 2000-199164 A | 7/2000 |
| JP | 2008-231597 A | 10/2008 |

(Continued)

OTHER PUBLICATIONS

International Search Report dated Jul. 31, 2018, issued in counterpart International Application No. PCT/JP2018/021329 (2 pages).

(Continued)

*Primary Examiner* — Jeremy R Pierce
(74) *Attorney, Agent, or Firm* — Westerman, Hattori, Daniels & Adrian, LLP

(57) ABSTRACT

A long-fiber nonwoven fabric includes fibers having a birefringence (Δn) of more than or equal to 0.005 and less than or equal to 0.020 and an average fiber diameter of more than or equal to 30 μm and less than or equal to 60 μm, and has a basis weight amount of more than or equal to 50 g/m² and less than or equal to 120 g/m², an average value of Gurley bending resistances in an MD direction and a CD direction according to JIS L1096 (2010) 8.22.1 Method A of more than or equal to 100 mg and less than or equal to 200 mg, and a value of the Gurley bending resistance in the MD direction/the Gurley bending resistance in the CD direction of less than or equal to 3.0.

4 Claims, No Drawings

(56) References Cited

FOREIGN PATENT DOCUMENTS

| | | | |
|---|---|---|---|
| JP | 2010-119998 A | 6/2010 | |
| JP | 2010-121261 A | 6/2010 | |
| JP | 2011-536 A | 1/2011 | |
| JP | 2012-17529 A | 1/2012 | |
| JP | 2014-64969 A | 4/2014 | |

OTHER PUBLICATIONS

Extended (Supplementary) European Search Report dated Jan. 19, 2021, issued in counterpart EP Application No. 18813369.8. (9 pages).

Office Action dated Jul. 5, 2021, issued in counterpart CN application No. 201880036931.3, with English translation. (5 pages).

* cited by examiner

LONG-FIBER NONWOVEN FABRIC AND FILTER REINFORCEMENT MATERIAL USING THE SAME

TECHNICAL FIELD

The present invention relates to a long-fiber nonwoven fabric suitable for a filter reinforcement material.

BACKGROUND ART

Polyethylene terephthalate long-fiber nonwoven fabrics have good dynamic physical properties, also have air permeability and water permeability, and are used for many applications. However, when a polyethylene terephthalate long-fiber nonwoven fabric is used as a material for a molded body, it is difficult for the fabric to follow a mold such as an uneven mold in a wide temperature range, and to be molded in various shapes.

As a cabin filter for an air purifier or a car, it is common to use a pleated filter in order to improve dust removal performance, deodorization performance, and the like. When a nonwoven fabric is used as a reinforcement material for the filter, the nonwoven fabric to be used is required to have a property that it can be pleated to have an arbitrary number of pleats and an arbitrary spacing therebetween. In addition, in order to avoid occurrence of contact or close contact between pleats of the filter during actual use, the filter is required to have rigidity having pleat shape retention property, and the nonwoven fabric serving as a reinforcement material is also required to have rigidity. That is, the nonwoven fabric serving as a reinforcement material is required to have both pleating property and pleat shape retention property.

As nonwoven fabrics used as a reinforcement material for a filter, a short-fiber nonwoven fabric using polyethylene terephthalate-based core-sheath composite fibers having a low melting-point resin arranged in a sheath component, and a long-fiber nonwoven fabric having low melting-point resin fibers mixed therein are proposed (see, for example, PTLs 1 to 2). Although these nonwoven fabrics have both pleating property and pleat shape retention property, manufacturing-related costs thereof are high.

On the other hand, filter reinforcement materials using polyethylene terephthalate long-fiber nonwoven fabrics that improve pleat shape retention property and durability of a filter are proposed (see, for example, PTL 3). Although the basis weight amount is increased to improve rigidity and secure shape retention property, a filter unit has an increased pressure loss and poor pleating property due to an increase in thickness.

CITATION LIST

Patent Literature

PTL 1: Japanese Patent Laying-Open No. 2008-231597
PTL 2: Japanese Patent Laying-Open No. 2000-199164
PTL 3: Japanese Patent Laying-Open No. 2011-000536

SUMMARY OF INVENTION

Technical Problem

The present invention has been made in view of the aforementioned circumstances, and an object thereof is to provide a long-fiber nonwoven fabric having pleating property suitable for a filter reinforcement material, and also having rigidity that satisfies pleat shape retention property.

Solution to Problem

As a result of earnest studies to solve the aforementioned problem, the present inventors have finally completed the present invention. Specifically, the present invention is as follows:

1. A long-fiber nonwoven fabric including fibers having a birefringence ($\Delta n$) of more than or equal to 0.005 and less than or equal to 0.020 and an average fiber diameter of more than or equal to 30 μm and less than or equal to 60 μm, the long-fiber nonwoven fabric having a basis weight amount of more than or equal to 50 g/m$^2$ and less than or equal to 120 g/m$^2$, an average value of Gurley bending resistances in an MD direction and a CD direction according to JIS L1096 (2010) 8.22.1 Method A of more than or equal to 100 mg and less than or equal to 200 mg, and a value of the Gurley bending resistance in the MD direction/the Gurley bending resistance in the CD direction of less than or equal to 3.0.

2. The long-fiber nonwoven fabric according to 1 described above, wherein the fibers constituting the long-fiber nonwoven fabric are single fibers made of a resin containing polyethylene terephthalate serving as a main component and more than or equal to 0.02 mass % and less than or equal to 5 mass % of a thermoplastic polystyrene-based copolymer mixed thereto.

3. The long-fiber nonwoven fabric according to 2 described above, wherein the thermoplastic polystyrene-based copolymer has a glass transition point temperature of 100 to 160° C.

4. A filter reinforcement material using the long-fiber nonwoven fabric according to any one of 1 to 3 described above.

5. A pleated filter using the filter reinforcement material according to 4 described above.

Advantageous Effects of Invention

According to the present invention, with the above configuration, a long-fiber nonwoven fabric suitable for a filter reinforcement material is obtained, which is excellent in pleating property, has rigidity that is less likely to cause close contact between pleats under actual use, and is excellent in pleat shape retention property. In addition, since the long-fiber nonwoven fabric is made of fibers having a single component, a long-fiber nonwoven fabric that is manufactured at an inexpensive cost can be provided.

DESCRIPTION OF EMBODIMENTS

Hereinafter, a long-fiber nonwoven fabric of the present invention will be described in detail.

Fibers constituting the long-fiber nonwoven fabric of the present invention have a birefringence index ($\Delta n$) of more than or equal to 0.005 and less than or equal to 0.020, preferably more than or equal to 0.007 and less than or equal to 0.019, more preferably more than or equal to 0.008 and less than or equal to 0.017, and further preferably more than or equal to 0.009 and less than or equal to 0.015. When the birefringence index ($\Delta n$) is less than 0.005, the long-fiber nonwoven fabric has an excellent pleating property, but has a decreased rigidity due to deformation of the fibers. Thus, contact or close contact between pleats is likely to occur when the long-fiber nonwoven fabric is actually used as a filter reinforcement material. When the birefringence index (Δn) is more than 0.020, the long-fiber nonwoven fabric has an improved rigidity and can serve as a filter reinforcement material excellent in shape retention property, but it is difficult to pleat the long-fiber nonwoven fabric to have an arbitrary number of pleats and an arbitrary spacing therebetween.

The fibers constituting the long-fiber nonwoven fabric of the present invention have an average fiber diameter of more than or equal to 30 μm and less than or equal to 60 μm, and the long-fiber nonwoven fabric has a basis weight amount of more than or equal to 50 g/m² and less than or equal to 120 g/m². Although the combination of the average fiber diameter of the fibers constituting the long-fiber nonwoven fabric and the basis weight amount of the long-fiber nonwoven fabric is not particularly limited, it is preferable to increase the average fiber diameter when decreasing the basis weight amount, and to decrease the average fiber diameter when increasing the basis weight amount. Specifically, when the basis weight amount is more than or equal to 50 g/m² and less than or equal to 70 g/m², the average fiber diameter is preferably more than or equal to 50 μm and less than or equal to 60 μm; when the basis weight amount is more than or equal to 70 g/m² and less than or equal to 90 g/m², the average fiber diameter is preferably more than or equal to 40 μm and less than or equal to 50 μm; and when the basis weight amount is more than or equal to 90 g/m² and less than or equal to 120 g/m², the average fiber diameter is preferably more than or equal to 30 μm and less than or equal to 40 μm.

The long-fiber nonwoven fabric of the present invention has an average value of Gurley bending resistances in an MD direction and a CD direction according to JIS L1096 (2010) 8.22.1 Method A of more than or equal to 100 mg and less than or equal to 200 mg, preferably more than or equal to 110 mg and less than or equal to 190 mg, and more preferably more than or equal to 120 mg and less than or equal to 180 mg. When the average value of the Gurley bending resistances in the MD direction and the CD direction is less than 100 mg, contact or close contact between pleats is likely to occur when the long-fiber nonwoven fabric is actually used as a filter reinforcement material. When the average value of the Gurley bending resistances in the MD direction and the CD direction is more than 200 mg, it is difficult to pleat the long-fiber nonwoven fabric to have an arbitrary number of pleats and an arbitrary spacing therebetween when it is actually used as a filter reinforcement material.

In addition, when the Gurley bending resistance in the MD direction is more than 250 mg, it is difficult to pleat the long-fiber nonwoven fabric to have an arbitrary number of pleats and an arbitrary spacing therebetween when it is actually used as a filter reinforcement material, and thus it is not preferable.

It should be noted that the "MD direction" in the long-fiber nonwoven fabric means a direction of a flow in a manufacturing device in a process of manufacturing the long-fiber nonwoven fabric, and the "CD direction" in the long-fiber nonwoven fabric means a width direction perpendicular to the flow in the manufacturing device in the process of manufacturing the long-fiber nonwoven fabric.

It is extremely important for the long-fiber nonwoven fabric of the present invention to have a value of the Gurley bending resistance in the MD direction/the Gurley bending resistance in the CD direction according to JIS L1096 (2010) 8.22.1 Method A of less than or equal to 3.0, preferably less than or equal to 2.0, and more preferably less than or equal to 1.5. When the value of the Gurley bending resistance in the MD direction/the Gurley bending resistance in the CD direction is more than 3.0, it is difficult to pleat the long-fiber nonwoven fabric to have an arbitrary number of pleats and an arbitrary spacing therebetween when it is actually used as a filter reinforcement material. Although the lower limit value of the value of the Gurley bending resistance in the MD direction/the Gurley bending resistance in the CD direction is not particularly limited, the value is usually more than or equal to 1.0 in long-fiber nonwoven fabrics.

The fibers constituting the long-fiber nonwoven fabric of the present invention are preferably single fibers made of a resin containing polyethylene terephthalate serving as a main component and a thermoplastic polystyrene-based copolymer mixed thereto. With respect to 100 mass % of the polyethylene terephthalate serving as a main component, the mixed amount of the thermoplastic polystyrene-based copolymer is preferably more than or equal to 0.02 mass % and less than or equal to 5 mass %, more preferably more than or equal to 0.1 mass % and less than or equal to 3 mass %, and further preferably more than or equal to 0.3 mass % and less than or equal to 1 mass %. The effect of mixture described above is obtained by setting the mixed amount to more than or equal to 0.02 mass %. Although the upper limit of the mixed amount of the thermoplastic polystyrene-based copolymer is not particularly limited, if it is excessively mixed, the fibers are broken due to a difference in stretchability between the polyethylene terephthalate and the thermoplastic polystyrene-based copolymer, causing a deterioration in operability. Thus, the mixed amount of the thermoplastic polystyrene-based copolymer is preferably less than or equal to 5 mass %.

It should be noted that the "single fibers" mean that they are not composite fibers such as core-sheath type composite fibers, side-by-side type composite fibers, or the like.

Polyethylene terephthalate is more excellent in mechanical strength, heat resistance, shape retention property, and the like, than resins such as polyethylene and polypropylene. In order to effectively exhibit such effects, the content of the polyethylene terephthalate serving as a main component in the resin used for the fibers constituting the long-fiber nonwoven fabric of the present invention is preferably more than or equal to 90 mass % and less than or equal to 99.8 mass %, more preferably more than or equal to 93 mass % and less than or equal to 99.5 mass %, and further preferably more than or equal to 94 mass % and less than or equal to 98 mass %, with respect to 100 mass % of the entire long-fiber nonwoven fabric, when the mixed amount of the thermoplastic polystyrene-based copolymer is taken into consideration. It should be noted that, other than polyethylene terephthalate, a polyester resin such as polytrimethylene terephthalate, polybutylene terephthalate, or polyethylene naphthalate may be blended, as long as the content thereof is less than or equal to 10 mass %.

The polyethylene terephthalate used for the present invention has an intrinsic viscosity of preferably more than or equal to 0.3 dl/g, more preferably more than or equal to 0.4 dl/g, further preferably more than or equal to 0.5 dl/g, and most preferably more than or equal to 0.55 dl/g. By setting the intrinsic viscosity of the polyethylene terephthalate to more than or equal to 0.3 dl/g, the resin is less likely to be thermally deteriorated, and the long-fiber nonwoven fabric can have an improved durability.

The thermoplastic polystyrene-based copolymer used for the present invention has a glass transition point temperature of preferably more than or equal to 100° C. and less than or equal to 160° C., more preferably more than or equal to 110° C. and less than or equal to 155° C., and further preferably more than or equal to 120° C. and less than or equal to 150°

C. In addition, the thermoplastic polystyrene-based copolymer is preferably incompatible in the polyethylene terephthalate. When the thermoplastic polystyrene-based copolymer has a glass transition point temperature which is higher than that of the polyethylene terephthalate and is more than or equal to 100° C., crystallization of the fibers constituting the long-fiber nonwoven fabric can be suppressed. As the effect thereof, for example, by applying heat under planar constraint described later, the fibers can be stuck to each other and can further be processed into a long-fiber nonwoven fabric having less dimensional change due to suppressed thermal shrinkage. On the other hand, the glass transition point temperature is preferably less than or equal to 160° C., when spinning productivity is taken into consideration. The glass transition point temperature is a value obtained by being measured at a temperature increasing rate of 20° C./minute according to JIS K7122 (1987).

Although the thermoplastic polystyrene-based copolymer used for the present invention is not particularly limited as long as it has a glass transition point temperature of more than or equal to 100° C. and less than or equal to 160° C., it is preferably a styrene-conjugated diene block copolymer, an acrylonitrile-styrene copolymer, an acrylonitrile-butadiene-styrene copolymer, a styrene-acrylic acid ester copolymer, or a styrene-methacrylic acid ester copolymer, for example. Among these copolymers, a styrene-acrylic acid ester copolymer or a styrene-methacrylic acid ester copolymer is more preferable, and a styrene-methacrylic acid ester copolymer is further preferable. Examples of the styrene-methacrylic acid ester copolymer include a styrene-methyl methacrylate-maleic anhydride copolymer. These copolymers may be contained alone or in combination. Examples of commercially available products include PLEXIGLAS HW55 manufactured by Rohm GmbH & Co. KG, which is particularly preferable because it exhibits an excellent effect with a small additive amount.

The long-fiber nonwoven fabric of the present invention is preferably a planar constraint long-fiber nonwoven fabric, especially a planar constraint spunbond nonwoven fabric. Planar constraint is to planarly sandwich a fiber web in a thickness direction and planarly apply pressure thereon. Planar constraint can be performed, for example, by pressing the entire sheet of the fiber web between a flat roll and a sheet-like body such as a felt belt, a rubber belt, or a steel belt. In addition, although the fiber web subjected to temporary compression bonding is subjected to permanent compression bonding (thermosetting) under planar constraint in the present invention, this is different from partial compression bonding that performs compression bonding between a flat roll and an engraved roll or between engraved rolls, and linear compression bonding that performs compression bonding between flat rolls. In the case of partial compression bonding, fibers are partially fixed, and thus a stress concentrates on a compression-bonded portion and a long-fiber nonwoven fabric difficult to be pleated is obtained. Further, in the case of linear compression bonding, fibers are entirely compression-bonded excessively, and thus the fibers are deformed and a long-fiber nonwoven fabric having a low bending resistance and a high pressure loss is obtained. On the other hand, when compression bonding is performed under planar constraint, thermal shrinkage of the fiber web in an in-plane direction can be suppressed. As a result, in the obtained planar constraint long-fiber nonwoven fabric, the fibers are fixed to each other over the entire sheet while being suppressed from deformation. Thus, the planar constraint long-fiber nonwoven fabric has an excellent bending resistance.

The long-fiber nonwoven fabric of the present invention is preferably a long-fiber nonwoven fabric not subjected to mechanical interlacing. In the case of a long-fiber nonwoven fabric subjected to mechanical interlacing, it is difficult to sharply pleat the long-fiber nonwoven fabric, which is not preferable. Further, in the case of a nonwoven fabric made of short fibers, local deformation due to slip of the fibers or the like occurs, and it is difficult to pleat the nonwoven fabric to have an equal spacing between pleats.

Next, a method for manufacturing the long-fiber nonwoven fabric of the present invention will be described.

The method for manufacturing the long-fiber nonwoven fabric of the present invention includes the step of performing spinning at a ratio between a take-up velocity and a discharge linear velocity (hereinafter referred to as a "draft ratio") of less than or equal to 200, and the step of performing temporary compression bonding on a fiber web obtained after spinning and then performing permanent compression bonding thereon under planar constraint.

First, according to a conventional method, predetermined amounts of polyethylene terephthalate and a thermoplastic polystyrene-based copolymer are blended and dried, and thereafter spinning is performed using a melt spinning machine.

In the present invention, it is preferable to set the draft ratio to less than or equal to 200 to obtain a long-fiber nonwoven fabric having a suitable birefringence index ($\Delta n$). When the draft ratio is more than 200, the degree of crystallization of the fibers constituting the long-fiber nonwoven fabric becomes high, and a long-fiber nonwoven fabric difficult to be pleated is obtained. The draft ratio is more preferably less than or equal to 175, and is further preferably less than or equal to 150.

The draft ratio is provided by the following equations:

(Ratio between Take-up Velocity and Discharge Linear Velocity)

$$\text{draft ratio } (\Psi) = \text{take-up velocity } (Vs)/\text{discharge linear velocity } (V_0)$$

(Discharge Linear Velocity)

$$\text{discharge linear velocity } (V_0) = \text{single hole discharge amount } (Q)/\text{spinneret hole cross-sectional area } (Da).$$

Although other spinning conditions are not particularly limited, it is preferable to spin a yarn from a spinneret, supply dry air to an ejector at a pressure (jet pressure) of 0.3 to 2.0 kg/cm$^2$, and draw the yarn. Further, by controlling the pressure of supplying the dry air within the above range, the take-up velocity can be easily controlled to be within a desired range, and the yarn can be appropriately dried.

Then, the discharged yarn is cooled, and fibers of the yarn are opened onto a conveyor located below and are collected. Thereby, a fiber web (long-fiber fleece) may be obtained. On this occasion, alignment of fibers in the fiber web in longitudinal and lateral directions can be controlled by arranging opening jigs in the shape of peaks and valleys, at appropriate spacing and angle. Specifically, it is preferable to set the angle of tips of the peaks and valleys to be in the range of 120 to 150°. By adjusting the angle to be within the above range, the value of the Gurley bending resistance in the MD direction/the Gurley bending resistance in the CD direction can be set to less than or equal to 3.0, and thus a long-fiber nonwoven fabric excellent in pleating property is obtained.

According to a common method for manufacturing a spunbond nonwoven fabric, the obtained fiber web is subjected to embossing or the like that performs partial compression bonding between a flat roll and an engraved roll or between engraved rolls. However, since the fiber web obtained by spinning at a low spinning speed as in the present invention has a low orientation and is likely to shrink, problems such as width shrinkage and wrinkling occur when the fiber web is subjected to embossing or the like. In the present invention, temporary compression bonding is performed and then permanent compression bonding is performed under planar constraint as described below, which can easily suppress occurrence of width shrinkage and wrinkling.

Temporary compression bonding is to compression-bond a fiber web by applying pressure thereon in the thickness direction. Temporary compression bonding is performed to cause planar constraint in permanent compression bonding to be easily performed. For example, thermocompression bonding may be performed using a pair of temporary thermocompression bonding rolls including two flat rolls, at a surface temperature of each flat roll of more than or equal to 60° C. and less than or equal to 140° C., and a pushing pressure of more than or equal to 5 kN/m and less than or equal to 30 kN/m. The surface temperature of each flat roll is more preferably more than or equal to 70° C. and less than or equal to 120° C., and the pushing pressure is more preferably more than or equal to 7 kN/m and less than or equal to 20 kN/m.

Further, for easier permanent compression bonding, the fiber web subjected to temporary compression bonding may be subjected to hydrous treatment by which water is sprayed on the fiber web with a spray such that the fiber web has a water content of more than or equal to 1 mass % and less than or equal to 30 mass %.

Then, permanent compression bonding is performed. Permanent compression bonding is to thermoset and compression-bond the fiber web subjected to temporary compression bonding, under planar constraint. Planar constraint is preferably performed using a flat roll and a sheet-like body such as a felt belt, a rubber belt, or a steel belt, as described above. Among these belts, a felt belt is particularly preferable, because its surface is fibrous and it easily constrains the fiber web in the in-plane direction. Since the fiber web is constrained by the sheet-like body, problems such as width shrinkage and wrinkling are solved. Further, when permanent compression bonding is performed under planar constraint, the fibers are fixed over the entire sheet. Thereby, deformation of the fibers are suppressed, and an excellent bending resistance can be obtained.

Thermosetting and planar constraint are preferably performed at a surface temperature of the roll of more than or equal to 120° C. and less than or equal to 180° C., under conditions of a pushing pressure of more than or equal to 10 kPa and less than or equal to 400 kPa, a processing time of more than or equal to 3 seconds and less than or equal to 30 seconds, and a processing speed of more than or equal to 1 m/minute and less than or equal to 30 m/minute.

By setting the surface temperature of the roll to preferably more than or equal to 120° C., compression bonding is easily performed. The surface temperature of the roll is more preferably more than or equal to 130° C. On the other hand, by setting the surface temperature of the roll to preferably less than or equal to 180° C., excessive compression bonding is suppressed. The surface temperature of the roll is more preferably less than or equal to 160° C.

By setting the pushing pressure to preferably more than or equal to 10 kPa, planar constraint is easily performed. The pushing pressure is more preferably more than or equal to 30 kPa, further preferably more than or equal to 50 kPa, particularly preferably more than or equal to 100 kPa, and most preferably more than or equal to 200 kPa. On the other hand, by setting the pushing pressure to preferably less than or equal to 400 kPa, excessive compression bonding is suppressed. The pushing pressure is more preferably less than or equal to 350 kPa, and further preferably less than or equal to 300 kPa.

By setting the processing time to preferably more than or equal to 3 seconds, compression bonding is easily performed. The processing time is more preferably more than or equal to 5 seconds. On the other hand, by setting the processing time to preferably less than or equal to 30 seconds, excessive compression bonding is suppressed. The processing time is more preferably less than or equal to 20 seconds.

By setting the processing speed to preferably more than or equal to 1 m/minute, excessive compression bonding is suppressed. The processing speed is more preferably more than or equal to 5 m/minute. On the other hand, by setting the processing speed to preferably less than or equal to 30 m/minute, compression bonding is easily performed. The processing speed is more preferably less than or equal to 20 m/minute.

The long-fiber nonwoven fabric of the present invention obtained as described above is suitable for a filter reinforcement material excellent in pleating property and pleat shape retention property.

EXAMPLES

In the following, the present invention will be described more specifically based on examples. It should be noted that the present invention is not limited by the following examples, and can also be implemented by making modifications within a range in which they can be consistent with purports described above and hereinafter. Any of such modifications are encompassed in the technical scope of the present invention.

<Intrinsic Viscosity>

First, 0.1 g of a polyethylene terephthalate resin was weighed and dissolved in 25 ml of a mixed solvent of phenol and tetrachloroethane (60/40 (mass ratio)). Intrinsic viscosity was measured three times at 30° C. using an Ostwald viscometer, and an average value thereof was determined.

<Glass Transition Point Temperature>

According to JIS K7122 (1987), the glass transition point temperature of a thermoplastic polystyrene-based copolymer was determined in a nitrogen stream, at a temperature increasing rate of 20° C./minute, using a differential scan calorimeter (DSC, "Q100" manufactured by TA Instruments, Inc.).

<Basis Weight Amount>

According to JIS L1913 (2010) 6.2, a basis weight amount, which is a mass per unit area, was measured.

<Average Fiber Diameter>

Five arbitrary positions in a sample of a long-fiber nonwoven fabric were selected, the diameter of each single fiber was measured for n=20 using an optical microscope, and an average value thereof was determined.

<Birefringence Index ($\Delta n$)>

Five arbitrary positions in the sample of the long-fiber nonwoven fabric were selected, fiber diameters and retardation were read using a NIKON polarizing microscope OPTIPHOT-POL, and a birefringence index ($\Delta n$) was determined.

<Bending Resistance>

According to JIS L1096 (2010) 8.22.1 Method A (Gurley method), the sample had a width of 25 mm and a length of 89 mm, a load was set to 5 g, and five arbitrary positions were selected in each of the MD direction and the CD direction in the long-fiber nonwoven fabric. In each direction, bending resistances were measured, and an average value thereof was defined as a measured value.

<Evaluation of Pleating Property: Ease of Pleating>

In the long-fiber nonwoven fabric, 200 pleats were folded at 70 pleats/minute using a reciprocating pleating machine, with a pleat height being set to 30 mm and a temperature immediately after pleating being set to 50° C., and a pleat angle when the fifth pleat from the start of pleating was obtained was defined as an index.

A: less than or equal to 10°
B: more than 10° and less than or equal to 15°
C: more than 15° and less than or equal to 20°

<Evaluation of Pleating Property: Close Contact Between Pleats>

In the long-fiber nonwoven fabric having a size of 150 cm by 150 cm, a unit of 25 pleats was fabricated with a pleat height being set to 30 mm. Then, air was blown through the long-fiber nonwoven fabric at a planar wind speed of 1 m/second to 4 m/second, and it was visually checked in which wind speed range the pleats were brought into close contact with each other.

It should be noted that, as a filter material, a composite of a PP melt blown nonwoven fabric with a fiber diameter of substantially 1 μm (basis weight amount: 20 g/m$^2$) and a low melting-point adhesive nonwoven fabric (DYNAC manufactured by Kureha Tech) was used.

A: a planar wind speed of more than or equal to 3 m/second
B: a planar wind speed of more than or equal to 2 m/second and less than 3 m/second
C: a planar wind speed of more than or equal to 1 m/second and less than 2 m/second Example 1

A resin containing polyethylene terephthalate having an intrinsic viscosity of 0.63 and 0.40 mass % of PLEXIGLAS HW55 manufactured by Rohm GmbH & Co. KG (hereinafter referred to as "HW55"), which is a styrene-methyl methacrylate-maleic anhydride copolymer having a glass transition point temperature of 122° C., mixed thereto was spun from a spinneret having an orifice diameter of 0.45 mm, at a spinning temperature of 285° C. and a single hole discharge amount of 3.5 g/minute, using a long-fiber nonwoven fabric spinning apparatus. Further, dry air was supplied to an ejector at a pressure (jet pressure) of 125 kPa, and the resin was drawn in one step. Opening jigs were alternately arranged in the shape of peaks and valleys to have an angle of 130°, and fibers of the resin were opened onto a conveyor located below and were collected. Thereby, a long-fiber fleece was obtained. The spinning speed calculated from the fiber diameter was 2401 m/minute.

The obtained long-fiber fleece was subjected to temporary compression bonding, using a pair of temporary thermo-compression bonding rolls including two flat rolls, at a surface temperature of each flat roll of 80° C. and a pushing pressure of 8 kN/m. Then, the long-fiber fleece was subjected to permanent compression bonding under planar constraint using a felt calendar, at a surface temperature of a roll of 145° C., under conditions of a pushing pressure of 300 kPa, a processing time of 9.3 seconds, and a processing speed of 8.4 m/minute. Thereby, a long-fiber nonwoven fabric was obtained.

The obtained long-fiber nonwoven fabric had a basis weight amount of 94 g/m$^2$, a fiber diameter of 37 μm, a birefringence index of 0.0098, an average value of Gurley bending resistances in the MD direction and the CD direction of 152 mg, and a value of the Gurley bending resistance in the MD direction/the Gurley bending resistance in the CD direction of 1.22.

Example 2

A long-fiber fleece was obtained under the same conditions as those in Example 1, except that dry air was supplied to the ejector at a pressure (jet pressure) of 75 kPa. The spinning speed calculated from the fiber diameter was 1777 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 93 g/m$^2$, a fiber diameter of 43 μm, a birefringence index of 0.005, an average value of Gurley bending resistances in the MD direction and the CD direction of 132 mg, and a value of the Gurley bending resistance in the MD direction/the Gurley bending resistance in the CD direction of 0.58.

Example 3

A long-fiber fleece was obtained under the same conditions as those in Example 1, except that the resin was spun from the spinneret at a single hole discharge amount of 4.2 g/minute, and dry air was supplied to the ejector at a pressure (jet pressure) of 185 kPa. The spinning speed calculated from the fiber diameter was 3139 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 90 g/m$^2$, a fiber diameter of 35 μm, a birefringence index of 0.0152, an average value of Gurley bending resistances in the MD direction and the CD direction of 198 mg, and a value of the Gurley bending resistance in the MD direction/the Gurley bending resistance in the CD direction of 1.58.

Example 4

A long-fiber fleece was obtained under the same conditions as those in Example 3, except that dry air was supplied to the ejector at a pressure (jet pressure) of 150 kPa. The spinning speed calculated from the fiber diameter was 2609 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 71 g/m$^2$, a fiber diameter of 39 μm, a birefringence index of 0.0091, an average value of Gurley bending resistances in the MD direction and the CD direction of 133 mg, and a value of the Gurley bending resistance in the MD direction/the Gurley bending resistance in the CD direction of 1.90.

Example 5

A long-fiber fleece was obtained under the same conditions as those in Example 3, except that dry air was supplied to the ejector at a pressure (jet pressure) of 210 kPa. The spinning speed calculated from the fiber diameter was 3587 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 60 g/m$^2$, a fiber diameter of 33 μm, a birefringence index of 0.019, an average value of Gurley bending resistances in the MD direction and the CD direction of 109 mg, and a value of the Gurley bending resistance in the MD direction/the Gurley bending resistance in the CD direction of 1.61.

Example 6

The resin was spun from a spinneret having an orifice diameter of 0.55 mm, at a single hole discharge amount of 3.5 g/minute. Dry air was supplied to the ejector at a pressure (jet pressure) of 75 kPa, and the resin was drawn in one step. Fibers of the resin were opened onto the conveyor located below and were collected. Thereby, a long-fiber fleece was obtained. The spinning speed calculated from the fiber diameter was 1777 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 60 g/m$^2$, a fiber diameter of 43 μm, a birefringence index of 0.005, an average value of Gurley bending resistances in the MD direction and the CD direction of 111 mg, and a value of the Gurley bending resistance in the MD direction/the Gurley bending resistance in the CD direction of 1.19.

Example 7

A long-fiber fleece was obtained under the same conditions as those in Example 1, except that the opening jigs were alternately arranged in the shape of peaks and valleys to have an angle of 145°. The spinning speed calculated from the fiber diameter was 2401 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 90 g/m$^2$, a fiber diameter of 37 μm, a birefringence index of 0.010, an average value of Gurley bending resistances in the MD direction and the CD direction of 129 mg, and a value of the Gurley bending resistance in the MD direction/the Gurley bending resistance in the CD direction of 1.50.

Example 8

A long-fiber fleece was obtained under the same conditions as those in Example 1, except that the opening jigs were alternately arranged in the shape of peaks and valleys to have an angle of 120°. The spinning speed calculated from the fiber diameter was 2401 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 91 g/m$^2$, a fiber diameter of 38 μm, a birefringence index of 0.011, an average value of Gurley bending resistances in the MD direction and the CD direction of 159 mg, and a value of the Gurley bending resistance in the MD direction/the Gurley bending resistance in the CD direction of 1.19.

Comparative Example 1

The resin was spun from a spinneret having an orifice diameter of 0.47 mm, at a spinning temperature of 285° C. and a single hole discharge amount of 4.2 g/minute. Dry air was supplied to the ejector at a pressure (jet pressure) of 185 kPa, and the resin was drawn in one step. The opening jigs were alternately arranged in the shape of peaks and valleys to have an angle of 130°, and fibers of the resin were opened onto the conveyor located below and were collected. Thereby, a long-fiber fleece was obtained. The spinning speed calculated from the fiber diameter was 3139 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 91 g/m$^2$, a fiber diameter of 35 μm, a birefringence index of 0.022, an average value of Gurley bending resistances in the MD direction and the CD direction of 255 mg, and a value of the Gurley bending resistance in the MD direction/the Gurley bending resistance in the CD direction of 2.69.

Comparative Example 2

A long-fiber fleece was obtained under the same conditions as those in Example 1, except that the resin was spun from the spinneret at a single hole discharge amount of 3.5 g/minute, and dry air was supplied to the ejector at a pressure (jet pressure) of 75 kPa. The spinning speed calculated from the fiber diameter was 1777 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 51 g/m$^2$, a fiber diameter of 43 μm, a birefringence index of 0.010, an average value of Gurley bending resistances in the MD direction and the CD direction of 40 mg, and a value of the Gurley bending resistance in the MD direction/the Gurley bending resistance in the CD direction of 0.62.

Comparative Example 3

A long-fiber fleece was obtained under the same conditions as those in Example 1, except that the resin was spun from the spinneret at a single hole discharge amount of 1.55 g/minute, and dry air was supplied to the ejector at a pressure (jet pressure) of 75 kPa. The spinning speed calculated from the fiber diameter was 1856 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 70 g/m$^2$, a fiber diameter of 28 μm, a birefringence index of 0.020, an average value of Gurley bending resistances in the MD direction and the CD direction of 64 mg, and a value of the Gurley bending resistance in the MD direction/the Gurley bending resistance in the CD direction of 1.44.

Comparative Example 4

A long-fiber fleece was obtained under the same conditions as those in Example 1, except that the resin was spun from the spinneret at a single hole discharge amount of 4.2 g/minute, and dry air was supplied to the ejector at a pressure (jet pressure) of 220 kPa. The spinning speed calculated from the fiber diameter was 3589 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 61 g/m$^2$, a fiber diameter of 32 μm, a birefringence index of 0.021, an average value of Gurley bending resistances in the MD direction and the CD direction of 131 mg, and a value of the Gurley bending resistance in the MD direction/the Gurley bending resistance in the CD direction of 3.08.

Comparative Example 5

A long-fiber fleece was obtained under the same conditions as those in Example 1, except that the opening jigs were alternately arranged in the shape of peaks and valleys to have an angle of 160°. The spinning speed calculated from the fiber diameter was 2400 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 90 g/m$^2$, a fiber diameter of 38 μm, a birefringence index of 0.010, an average value of Gurley bending resistances in the MD direction and the CD direction of 132 mg, and a value of the Gurley bending resistance in the MD direction/the Gurley bending resistance in the CD direction of 3.19.

Comparative Example 6

Polyethylene terephthalate having an intrinsic viscosity of 0.63 was spun from a spinneret having an orifice diameter of 0.23 mm, at a spinning temperature of 285° C. and a single hole discharge amount of 0.9 g/minute, using the long-fiber nonwoven fabric spinning apparatus. Further, dry air was supplied to the ejector at a pressure (jet pressure) of 100 kPa, and the polyethylene terephthalate was drawn in one step. The opening jigs were alternately arranged in the shape of peaks and valleys to have an angle of 130°, and fibers were opened onto the conveyor located below and were collected. Thereby, a long-fiber fleece was obtained. The spinning speed calculated from the fiber diameter was 2217 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 200 g/m$^2$, a fiber diameter of 19.4 μm, a birefringence index of 0.019, an average value of Gurley bending resistances in the MD direction and the CD direction of 1694 mg, and a value of the Gurley bending resistance in the MD direction/the Gurley bending resistance in the CD direction of 1.21.

Comparative Example 7

A long-fiber fleece was obtained under the same conditions as those in Comparative Example 6, except that 0.40 mass % of HW55, which is a styrene-methyl methacrylate-maleic anhydride copolymer having a glass transition point temperature of 122° C., was mixed. The spinning speed calculated from the fiber diameter was 2234 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 200 g/m$^2$, a fiber diameter of 19.3 μm, a birefringence index of 0.019, an average value of Gurley bending resistances in the MD direction and the CD direction of 1656 mg, and a value of the Gurley bending resistance in the MD direction/the Gurley bending resistance in the CD direction of 1.31.

Comparative Example 8

A long-fiber fleece was obtained under the same conditions as those in Comparative Example 7, except that dry air was supplied to the ejector at a pressure (jet pressure) of 60 kPa. The spinning speed calculated from the fiber diameter was 1700 m/minute.

The obtained long-fiber fleece was subjected to temporary compression bonding, and then was subjected to permanent compression bonding under planar constraint using the felt calendar, as in Example 1. Thereby, a long-fiber nonwoven fabric was obtained.

The obtained long-fiber nonwoven fabric had a basis weight amount of 200 g/m$^2$, a fiber diameter of 22.3 μm, a birefringence index of 0.011, an average value of Gurley bending resistances in the MD direction and the CD direction of 1785 mg, and a value of the Gurley bending resistance in the MD direction/the Gurley bending resistance in the CD direction of 1.16.

Comparative Example 9

A long-fiber fleece was obtained under the same conditions as those in Comparative Example 7, except that the obtained long-fiber nonwoven fabric had a basis weight amount of 92 g/m$^2$. The spinning speed calculated from the fiber diameter was 2234 m/minute. The long-fiber nonwoven fabric had a fiber diameter of 19.4 μm, a birefringence index of 0.019, an average value of Gurley bending resistances in the MD direction and the CD direction of 87 mg, and a value of the Gurley bending resistance in the MD direction/the Gurley bending resistance in the CD direction of 1.22.

TABLE 1

| | | | Example 1 | Example 2 | Example 3 | Example 4 | Example 5 | Example 6 | Example 7 | Example 8 |
|---|---|---|---|---|---|---|---|---|---|---|
| Spinning Conditions | Spinneret temperature | [° C.] | 285 | 285 | 285 | 285 | 285 | 285 | 285 | 285 |
| | Single hole discharge amount | [g/min] | 3.5 | 3.5 | 4.2 | 4.2 | 4.2 | 3.5 | 3.5 | 3.5 |
| | Jet pressure | [kPa] | 125 | 75 | 185 | 150 | 210 | 75 | 125 | 125 |
| | Draft ratio | — | 131 | 97 | 143 | 119 | 163 | 131 | 131 | 124 |
| | Angle of opening jigs | [°] | 130 | 130 | 130 | 130 | 130 | 130 | 145 | 120 |
| | Spinning speed | [m/min] | 2401 | 1777 | 3139 | 2609 | 3587 | 1777 | 2401 | 2401 |
| Physical Properties of Non-woven Fabric | Basis weight amount | [g/m$^2$] | 94 | 93 | 90 | 71 | 60 | 60 | 90 | 91 |
| | Fiber diameter | [μm] | 37 | 43 | 35 | 39 | 33 | 43 | 37 | 38 |
| | Birefringence index (Δn) | — | 0.010 | 0.005 | 0.015 | 0.009 | 0.019 | 0.005 | 0.010 | 0.011 |
| | Bending Resistance MD direction | [mg] | 166 | 97 | 243 | 174 | 135 | 120 | 155 | 173 |
| | Bending Resistance CD direction | [mg] | 137 | 168 | 153 | 92 | 84 | 101 | 103 | 145 |
| | Average value in MD and CD directions | [mg] | 152 | 132 | 198 | 133 | 109 | 111 | 129 | 159 |
| | MD direction/CD direction | — | 1.22 | 0.58 | 1.58 | 1.90 | 1.61 | 1.19 | 1.50 | 1.19 |
| Pleating Property | Ease of pleating | — | A | A | B | B | B | A | B | A |
| | Close contact between pleats | — | A | B | A | A | B | B | A | A |

TABLE 2

| | | | Comparative Example 1 | Comparative Example 2 | Comparative Example 3 | Comparative Example 4 | Comparative Example 5 |
|---|---|---|---|---|---|---|---|
| Spinning Conditions | Spinneret temperature | [° C.] | 285 | 285 | 285 | 285 | 285 |
| | Single hole discharge amount | [g/min] | 4.2 | 3.5 | 1.6 | 4.2 | 3.5 |
| | Jet pressure | [kPa] | 185 | 75 | 75 | 220 | 125 |
| | Draft ratio | — | 156 | 97 | 229 | 175 | 131 |
| | Angle of opening jigs | [°] | 130 | 130 | 130 | 130 | 160 |
| | Spinning speed | [m/min] | 3139 | 1777 | 1856 | 3589 | 2400 |
| Physical Properties of Non-woven Fabric | Basis weight amount | [g/m$^2$] | 91 | 51 | 70 | 61 | 90 |
| | Fiber diameter | [μm] | 35 | 43 | 28 | 32 | 38 |
| | Birefringence index (Δn) | — | 0.022 | 0.010 | 0.020 | 0.021 | 0.010 |
| | Bending Resistance MD direction | [mg] | 372 | 27 | 75 | 197 | 201 |
| | Bending Resistance CD direction | [mg] | 138 | 43 | 52 | 64 | 63 |
| | Average value in MD and CD directions | [mg] | 255 | 40 | 64 | 131 | 132 |
| | MD direction/CD direction | — | 2.69 | 0.62 | 1.44 | 3.08 | 3.19 |
| Pleating Property | Ease of pleating | — | C | A | B | C | C |
| | Close contact between pleats | — | A | C | C | A | A |

| | | | Comparative Example 6 | Comparative Example 7 | Comparative Example 8 | Comparative Example 9 |
|---|---|---|---|---|---|---|
| Spinning Conditions | Spinneret temperature | [° C.] | 285 | 285 | 285 | 285 |
| | Single hole discharge amount | [g/min] | 0.9 | 0.9 | 0.9 | 0.9 |
| | Jet pressure | [kPa] | 100 | 100 | 60 | 100 |
| | Draft ratio | — | 124 | 126 | 94 | 124 |
| | Angle of opening jigs | [°] | 130 | 130 | 130 | 130 |
| | Spinning speed | [m/min] | 2217 | 2234 | 1700 | 2234 |
| Physical Properties of Non-woven Fabric | Basis weight amount | [g/m$^2$] | 200 | 200 | 200 | 92 |
| | Fiber diameter | [μm] | 19 | 19 | 22 | 19 |
| | Birefringence index (Δn) | — | 0.019 | 0.019 | 0.011 | 0.019 |
| | Bending Resistance MD direction | [mg] | 1856 | 1876 | 1920 | 95 |
| | Bending Resistance CD direction | [mg] | 1532 | 1436 | 1650 | 78 |
| | Average value in MD and CD directions | [mg] | 1694 | 1656 | 1785 | 87 |
| | MD direction/CD direction | — | 1.21 | 1.31 | 1.16 | 1.22 |
| Pleating Property | Ease of pleating | — | C | C | C | B |
| | Close contact between pleats | — | A | A | A | C |

As shown in Table 1, the long-fiber nonwoven fabrics obtained in Examples 1 to 8 were excellent in pleating property and pleat shape retention property.

In contrast, as shown in Table 2, the long-fiber nonwoven fabric obtained in Comparative Example 1 had an average value of Gurley bending resistances in the MD direction and the CD direction of more than 200 mg, and a value of the Gurley bending resistance in the MD direction/the Gurley bending resistance in the CD direction of more than 2.0. Thus, it had a very poor pleating property.

Although the long-fiber nonwoven fabric obtained in Comparative Example 2 had a very excellent pleating property, it had a significantly low average value of Gurley bending resistances in the MD direction and the CD direction, and thus close contact between pleats occurred easily.

Although the long-fiber nonwoven fabrics obtained in Comparative Examples 3 and 9 had an excellent pleating property, they had significantly low average values of Gurley bending resistances in the MD direction and the CD direction, and thus close contact between pleats occurred easily.

Since the long-fiber nonwoven fabrics obtained in Comparative Examples 4 and 5 had values of the Gurley bending resistance in the MD direction/the Gurley bending resistance in the CD direction of more than 3.0, they had an extremely poor pleating property, and it was impossible to pleat them to have an arbitrary number of pleats and an arbitrary spacing therebetween.

Since the long-fiber nonwoven fabrics obtained in Comparative Examples 6, 7, and 8 had high basis weight amounts and average values of Gurley bending resistances in the MD direction and the CD direction of more than 200 mg, they had an extremely poor pleating property, and it was impossible to pleat them to have an arbitrary number of pleats and an arbitrary spacing therebetween.

INDUSTRIAL APPLICABILITY

The long-fiber nonwoven fabric obtained in the present invention is a long-fiber nonwoven fabric suitable for a filter reinforcement material, which is excellent in pleating property, has rigidity that is less likely to cause close contact between pleats under actual use, and is excellent in pleat shape retention property. In addition, since the long-fiber nonwoven fabric is made of fibers having a single component, a long-fiber nonwoven fabric that is manufactured at an inexpensive cost can be provided, making a significant contribution to the industrial world.

The invention claimed is:

1. A long-fiber nonwoven fabric comprising fibers having a birefringence ($\Delta n$) of more than or equal to 0.005 and less than or equal to 0.020 and an average fiber diameter of more than or equal to 30 µm and less than or equal to 60 µm, the long-fiber nonwoven fabric having a basis weight amount of more than or equal to 50 g/m$^2$ and less than or equal to 120 g/m$^2$, an average value of Gurley bending resistances in an MD direction and a CD direction according to JIS L1096 (2010) 8.22.1 Method A of more than or equal to 100 mg and less than or equal to 200 mg, and a value of the Gurley bending resistance in the MD direction/the Gurley bending resistance in the CD direction of less than or equal to 3.0,
wherein the fibers constituting the long-fiber nonwoven fabric are single fibers made of a resin containing polyethylene terephthalate serving as a main component and more than or equal to 0.02 mass % and less than or equal to 5 mass % of a thermoplastic polystyrene-based copolymer mixed thereto.

2. The long-fiber nonwoven fabric according to claim 1, wherein the thermoplastic polystyrene-based copolymer has a glass transition point temperature of 100 to 160° C.

3. A filter reinforcement material using the long-fiber nonwoven fabric according to claim 1.

4. A pleated filter using the filter reinforcement material according to claim 3.

* * * * *